July 27, 1965 D. H. HAMSHER ETAL 3,197,563

NON-SYNCHRONOUS MULTIPLEX COMMUNICATION SYSTEM

Filed Aug. 15, 1961 3 Sheets-Sheet 1

INVENTORS,
DONALD H. HAMSHER
HARRY W. PARMER
ARTHUR C. PRICHARD
BY Jack H. Linscott
ATTORNEY

NON-SYNCHRONOUS MULTIPLEX COMMUNICATION SYSTEM

Filed Aug. 15, 1961

3 Sheets-Sheet 2

INVENTORS,
DONALD H. HAMSHER
HARRY W. PARMER
ARTHUR C. PRICHARD
BY Jack H. Linscott
ATTORNEY

NON-SYNCHRONOUS MULTIPLEX COMMUNICATION SYSTEM

Filed Aug. 15, 1961

3 Sheets-Sheet 3

INVENTORS,
DONALD H. HAMSHER
HARRY W. PARMER &
ARTHUR C. PRICHARD.
BY Jack H. Linscott
ATTORNEY.

United States Patent Office 3,197,563

Patented July 27, 1965

3,197,563

NON-SYNCHRONOUS MULTIPLEX COMMUNICATION SYSTEM

Donald H. Hamsher, West Long Branch, Harry W. Parmer, Oakhurst, and Arthur C. Prichard, Elberon, N.J., assignors to the United States of America as represented by the Secretary of the Army Filed Aug. 15, 1961, Ser. No. 131,687
1 Claim. (Cl. 179—15)
(Granted under Title 35, U.S. Code (1952), sec. 266)

The invention described herein may be manufactured and used by or for the Government for governmental purposes without the payment of any royalty thereon.

This invention relates to multiplex communications and more particularly to an improved asynchronous or non-synchronous multiplex communication system.

Time-division multiplex communication systems may be classified as synchronous, semi-synchronous or non-synchronous systems. In synchronous communication systems, all the incoming lines are sampled in rotation and the samples are transmitted in time sequences over a common medium to a receiver station. For proper distribution to the intended addressed receivers, a central sample distributor is required which must operate in synchronism and in-phase with the sampler. In the semi-synchronous communication systems, the speech sample bears its own tag or address so that sorting is accomplished at the receiver station by suitable recognition apparatus. With such recognition apparatus each receiver accepts only those speech samples which are intended for it and rejects the others. While such an arrangement avoids the complexity of the distributor apparatus, it still requires that all of the transmitters which make up the system be interdependent as far as sampling is concerned. On the transmission medium, the pulses of the outgoing train are allocated definite time slots. When all the available time slots are occupied, the capacity of the system is filled, and temporary idleness of any particular time slot does not make it available to a transmitter other than the one to which it has been assigned.

The non-synchronous system overcomes the limitations of both the synchronous and semi-synchronous systems. The transmitters are not intercoupled by a central sampling agency, but are independent of one another insofar as each transmitter applies to the signal which it transmits some characteristic or code which uniquely identifies the receiver for which it is destined. Heretofore, such systems were limited either to time-division multiplex transmission or frequency-division multiplex transmission. In the time-multiplex transmission there is assigned to each of the several substations, as the characteristic which identifies it, a specific pulse rate, and in which any transmitter desiring to communicate with a receiver to which such pulse rate has been assigned, employs the pulse rate in transmitting. The information in the message is carried by some appropriate form of modulation. Thus the identifying characteristic comprises a pulse time code. In frequency-division multiplex systems the message itself is imposed on the pulse groups in any desired fashion, for example, by frequency modulating a carrier of which the pulse is the envelope. The limited capacity of a frequency-division multiplex system is well known.

The separation of one pulse group from all others at the receiving station is possible, theoretically at least, in systems of these types by noting the timing arrangement or order of the incoming pulse groups. However, transmission distortion of pulses may occur by multipath or reflection effects which may give rise to excessive interference between pulses, erratic timing of pulses and resultant cross-talk noise or errors in reception depending on the type of system.

The present invention is particularly adapted for use in a communication system formed by a number of substations located apart from one another, each of which transmits and receives message signals non-synchronously on a common frequency band. Each of the substations may be provided with a transmitter apparatus, or receiver apparatus, or both transmitter and receiver apparatus. Further, each of the substations may transmit on a common frequency and in a non-directional fashion to all other substations.

It is a specific object of the present invention to provide a nonsynchronous communication system which eliminates the need for high timing accuracies, a centralized timing system and also eliminates the problems of finite transit.

It is another object of the invention to provide a non-synchronous communication system having an improved address code system whereby the addressed individual message signals are transmitted via a common medium for reception by only one selected receiver.

It is still another object of the present invention to provide a non-synchronous communication system wherein the interference arising from multiple path effects is greatly reduced.

In accordance with the present invention there is provided a non-synchronous transmission system which includes a plurality of transmitter stations each transmitting over an allocated channel spaced groups of pulses in accordance with a preestablished code representative of a message wave. The pulses are transmitted at preselected discrete time intervals respectively on each of a number of different sub-band frequencies. The entire allotted channel is thus divided into a number of frequency sub-bands. Code addressing is achieved by selecting any combination of sub-bands and time intervals to constitute individual established codes which may be said to comprise frequency domain selection and time domain modification. Also included in the system are a plurality of independent receiver stations including means for accepting any group of pulses that are received at preselected relative times on a number of preselected sub-band frequencies, and means for reproducing the message waves from the received accepted coded pulse groups.

For a better understanding of the invention, together with other and further objects thereof, reference is had to the following description taken in connection with the accompanying drawing in which.

Figure 1:
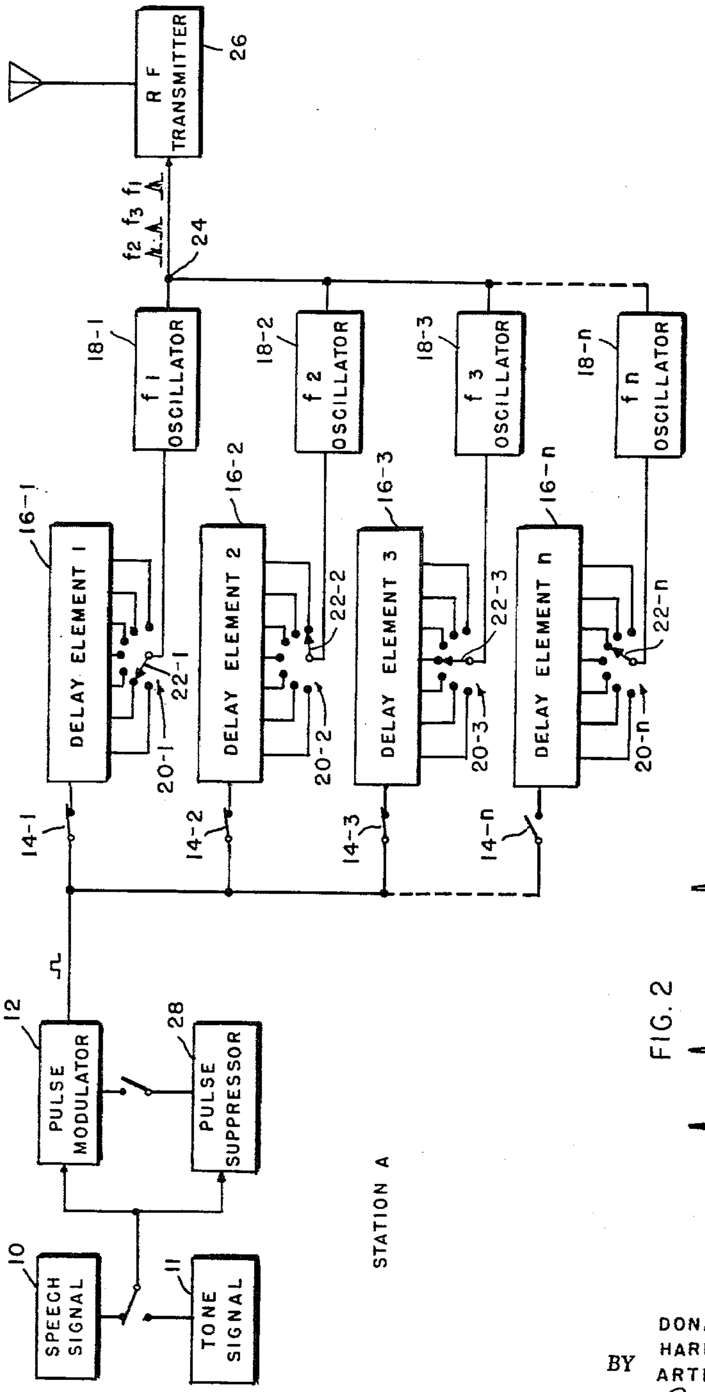
FIGS. 1 and 3 are respective block schematic diagrams of transmitter and receiver apparatus embodying the invention.

Referring now to FIG. 1 of the drawing, the voice signals from source 10, or supervisory signalling tones from tone signal source 11, are applied to a pulse modulator 12 which samples the input voice signals, or signalling tones, and converts the input signals into a train of pulses conveying the input intelligence. Such modulators are well known in the art and may comprise, for example, a delta-type modulator, a pulse position modulator or a pulse frequency modulator. The pulses derived from pulse modulator 12 are assumed to be of suitable durations and coded only insofar as the input message is concerned but do not contain a code or address for the intended receiver. The pulse modulator output pulses are passed by way of switches 14 to selected ones of like parallel paths, each of which comprises a serially connected adjustable delay element 16 and a sub-band radio-frequency generator or oscillator 18. The delay elements 16 may be of any desired construction and are each provided with a conventional dissipative load termination (not shown) and a number of external taps or contacts 20 spaced along the length of the delay structure which form the contact points of a selector switch 22. As shown, the output of a respective delay element 16 is applied as an input through the respective switches 22 to its respective associated sub-band generator 18 as a modulating pulse. The movable arm of the selector switch 22 is connected to one of the taps on its associated delay element in accordance with the degree of delay required in the corresponding sub-band generator for the selected receiver address. Thus, although the delay elements of all channels are alike, they may be adjusted for different degrees of delay to provide the appropriate receiver code address as hereinafter explained. Similarly, the channels to be operated at one time are selected by maniptulating switches 14. As shown, the outputs of the sub-band generators 18 are connected in common as at 24 to provide an input to RF transmitter 26 so that the outputs of the sub-band generators are transmitted at the same radio frequency. The range of delay intervals for each sub-band generator 18 may be chosen to lie in a range from zero delay to a delay of T seconds. A pulse suppressor 28 may be provided to suppress pulse modulator 12 whenever there is no speech signal at the input.

Figure 2:
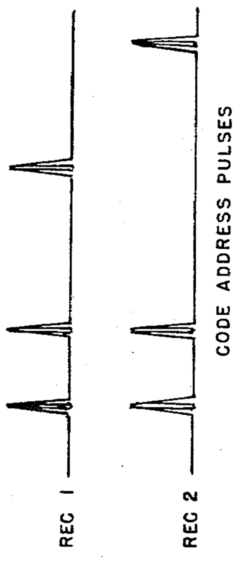
FIG. 2 illustrates two address codes which may be utilized in the invention.

By selecting a discrete delay for a predetermined number of delay elements 16, an output pulse derived from modulator 12 may be coded to address a receiver. For example, if delay elements 16–1, 16–2, and 16–3 are adjusted for different delays by means of respective selector switches 22–1, 22–2, and 22–3, then for each pulse derived from modulator 12 and applied to delay elements 16–1, 16–2, and 16–3 through respective switches 14–1, 14–2 and 14–3, three spaced sub-band frequencies will be derived from respective sub-band generators 18–1, 18–2 and 18–3. Thus, for each pulse derived from modulator 12, three sub-band frequency signals will be transmitted on a common carrier through RF transmitter 26. It is to be understood, of course, that the three bit code is illustrative only and that the invention is not to be limited thereto. In a typical address code frequency, sub-band $f_1$ may be utilized with a delay of $d_1$; frequency sub-band $f_2$ may be utilized with delay $d_2$; frequency sub-band $f_3$ may be utilized with delay $d_3$; etc. FIG. 2 illustrates two different series of such address codes for two different receivers. By such an arrangement different combinations of sub-band frequencies may be utilized and the spacing between respective sub-band frequencies may be varied to produce any number of address codes desired. The particular combination chosen constitutes the code of the receiver to be contacted. Thus by the use of two criteria, i.e. frequency domain selection and time domain modification, each receiver may be addressed by its individual code. In the illustration of FIG. 1, the delays are chosen such that sub-band frequencies $f_1$, $f_3$ and $f_2$ are applied in that order to RF transmitter 26.

Figure 3:
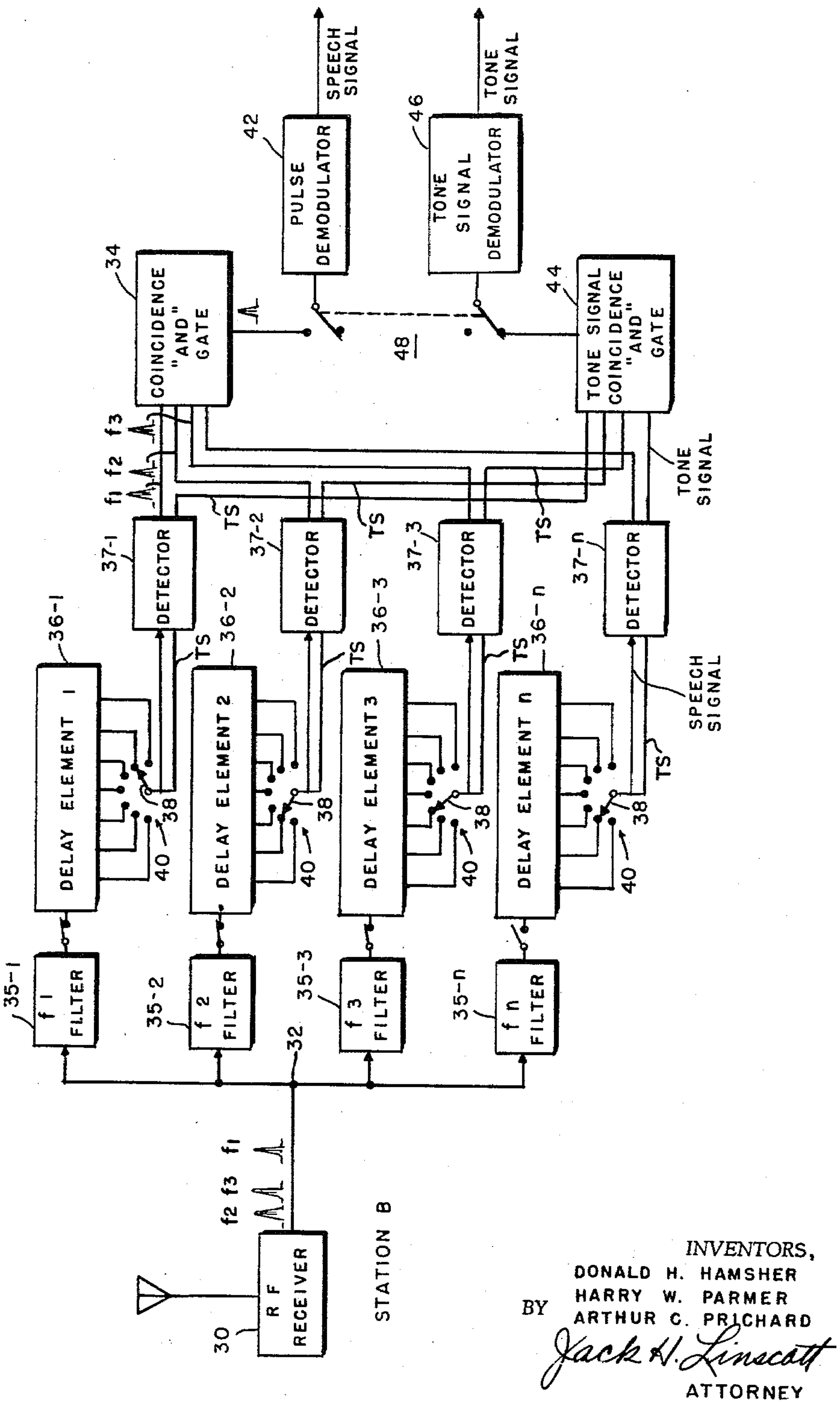

On embodiment of a receiver station apparatus which may be employed to decode the transmitted address information is shown in FIG. 3. The transmitted selected frequency sub-band signals are detected in RF receiver 30 which is tuned to receive the common carrier transmitted radio-frequency signal. The detected frequency sub-band signals are derived from a common receiver output terminal 32 and are applied, in the sequence they are received, in parallel through a number of channels to a coincidence amplitude "AND" gate 34 through respective filters 35, delay elements 36 and detectors 37. The delay elements are identical to the delay elements in the transmitter of FIG. 1 and the maximum delay of each element 36 is therefore also T seconds. The filters 35 determine the frequency domain of each address coded receiver.

For the sub-band frequencies in which pulses are delayed at the transmitter as part of the address code, the selector arm 38 associated with the delay element 36 of its respective channel is adjusted to one of the taps or contacts 40 on the delay element so that a delay of $(T-d)$ only is encountered by the received pulses. By such an arrangement, the received pulses are restored to their original relative position insofar as the time domain is concerned. Thus, using the address code illustrated in connection with the transmitter of FIG. 1, the first detected sub-band signal $f_1$ will pass through filter 35–1 to delay element 36–1 which is arranged to provide a delay of $(T-d_1)$ or $\Delta d_1$; the second detected sub-band signal $f_3$ will pass through filter 35–3 to delay element 36–3 which is arranged to provide a delay of $(T-d_3)$ or $\Delta d_3$; and the third detected sub-band signal $f_2$ passes through filter 35–2 to delay element 36–2 which is arranged to provide a delay of $(T-d_2)$ or $\Delta d_2$. It is to be understood, of course, that each receiver subscriber will be provided with the frequency filters 35 to pass only its code addressed sub-band frequencies. By such an arrangement, the pulses are restored to the time scale corresponding to their original relative positions at the transmitter. If the signals are detected in all parallel paths for which its address code was intended, then coincidence "AND" gate 34 will pass a single pulse to pulse demodulator 42 which will reproduce the input speech signal. If a tone signal is also address coded, then a separate tone coincidence "AND" gate 44 may be utilized together with a tone signal demodulator 46. A ganged switch 48 may be provided to switch from tone signal to speech. The tone signal path is indicated by the lines denoted by the legend "TS."

Figure 4:
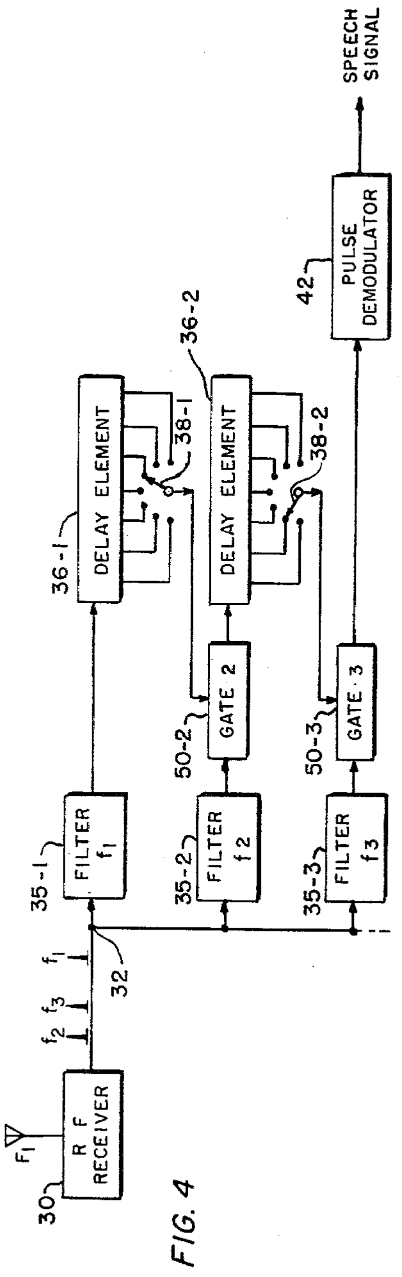
FIG. 4 is a block schematic diagram of another type of address code pulse receiver which may be used.

FIG. 4 illustrates another embodiment of a receiver station apparatus which may be employed to decode the transmitted address information. In this figure, like reference numerals refer to like elements. Referring now to FIG. 4, the transmitted selected frequency sub-band signals are detected in RF receiver 30 tuned to receive the common carrier transmitted radio-frequency signal. The detected frequency sub-band signals are derived from a common receiver output terminal 32 and are applied in the sequence they are received to parallel arranged channels. The first of these channels includes only a filter 35–1 and a delay element 36–1 connected in series in that order, while each of the remaining channels include a normally closed gate circuit 50, connected between a respective channel filter 35 and its associated delay element 36. Thus, assuming a code of *n*-digits per code group or frame, the number of channels requiring a gate circuit will be $(n-1)$. Each gate may be baised to respond only to pulses exceeding a specified minimum amplitude so that only pulses within a specified range of amplitudes will be acceptable. This is desirable because all pulses within a given code will generally have nearly the same amplitude on arrival at the receiver if they are nearly the same amplitude at transmission. This amplitude selectivity feature will greatly aid in rejection of spurious pulses and therefore will reduce noise. The range of amplitudes should be adjustable to compensate for variations in signal strength. When the receiver is on standby, this level of amplitude selection may be swept relatively slowly over its range so as to permit the receiver to respond to any correct call. When a correct code group has been received successively (sequentially) for five or ten times, a gate may be established which causes the receiver to be sensitive over a period of time preceding, during and following the code group frame interval sufficient to permit reception of the code group and its changes in relative position caused by modulation. At all other times, after establishment of the gate, the receiver will be insensitive. This gate can be rendered ineffective when desired, such as when the receiver is used to listen to more than one transmitter. Some form of pulse width discrimination will be very helpful in reducing noise due to interfering pulses. This may be accomplished readily by means now known. The delay elements 36 are identical to the delay elements in the transmitter of FIG. 1, with the maximum delay of each element 36 being T seconds as hereinabove mentioned. While not shown, it is to be understood that each of the delay elements 36 is conventionally terminated at its far end by a matched dissipative load to prevent reflection from the terminus of the delay element. As previously described, for the sub-bands in which pulses are delayed at the transmitter as part of the address code, the selector arm 38 associated with the delay element 36 of its respective channel is adjusted to one of the taps or contacts on the delay element. However, the selector arm 38–1 associated with delay element 36–1 is adjusted such that a prescribed delay equal to the delay between the detected first and second sub-band frequencies is provided by delay element 36–1. The output from delay element 36–1 as determined by selector arm 38–1 is applied as one input to gate 50–2. The other input to gate 50–2 is supplied through filter element 35–2. Thus the input to gate 50–2 from delay element 36–1 provides a gate pulse at the same instant that the second sub-band frequency $f_2$ is derived from filter element 35–2. As a result, the second sub-band frequency signal $f_2$ passes through gate 50–2 to delay element 36–2 when associated selector arm 38–2 is adjusted such that the signal applied to delay element 36–2 is delayed for a time which corresponds to the delay between the detection of the second sub-band signal $f_2$ and the third sub-band signal $f_3$. This circuitry is repeated for each channel following the first channel. In general terms, assuming a time delay $\Delta t$ between detected sub-band frequency $f_n$ and the next successive detected sub-band frequency $f_{(n-1)}$, then the delay for the $(n-1)$ channel must be set equal to $\Delta t$. If one is to assume a code of three digits as hereinabove described, then at the appearance of the third sub-band frequency signal, output signals will be derived from gate 50–3 which restore the received pulses to their original relative position insofar as the time domain is concerned. The output pulses from gate 50–3 are applied to a pulse demodulator 42 to reproduce the input speech signal.

Figure 5:
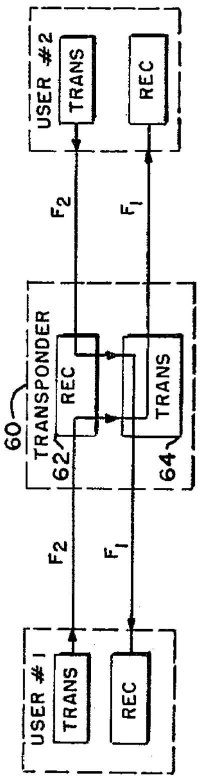
FIG. 5 is a block schematic diagram illustrating the use of a transponder between two subscriber stations.

In cases where it is desired to extend the range of coverage beyond the limits of propagation of an individual transmitter, a transponder 60 may be utilized as shown in FIG. 5. The transponder includes a receiver 62 and a transmitter 64, with the receiver being adapted to receive a code address at carrier frequency $F_2$ which differs from the address code carrier frequency $F_1$, and the output of receiver 62 is applied to transmitter 64 which retransmits the coded address at the normal carrier frequency $F_1$. For example, in FIG. 5, User number 1 will shift his carrier frequency from $F_1$ to $F_2$ by any suitable means and this carrier frequency, which includes the code address for User number 2, is received by the transponder receiver 62. The output of receiver 62 is fed to transmitter 64 which is adapted to retransmit the code address at carrier frequency $F_1$. It is this retransmitted carrier frequency $F_1$ which is normally received by the designated addressed User number 2. User number 2 will reply to User number 1 through the identical transponder, with the User number 2 transmitter also shifted to the frequency $F_2$ as hereinabove described. It is to be understood, of course, that the receiver transponder 62 receives all frequencies at $F_2$ and retransmits at frequency $F_1$ without demodulation or detection of the address code. By such an arrangement, increased range coverage can be handled in a rather simple manner without adding the additional functions of local switching centers. A supervisory tone signal may be supplied for the intended receiver as shown in FIG. 1, with the ringing signal being coded to provide the same address code as in speech transmission. The intended receiver must then have the capability of indicating to the calling party either that the called party was ready to receive a call, that is "ON" hook condition, or that the party line was busy. These are the supervisory conditions which may be incorporated in the tone signalling box shown in FIG. 1. It is also desirable in the case of a transponder to indicate through supervisory signals those calls which have arrived via the transponder so that the called party can respond via $F_2$, the radio-frequency for transponder operation.

Figure 6:
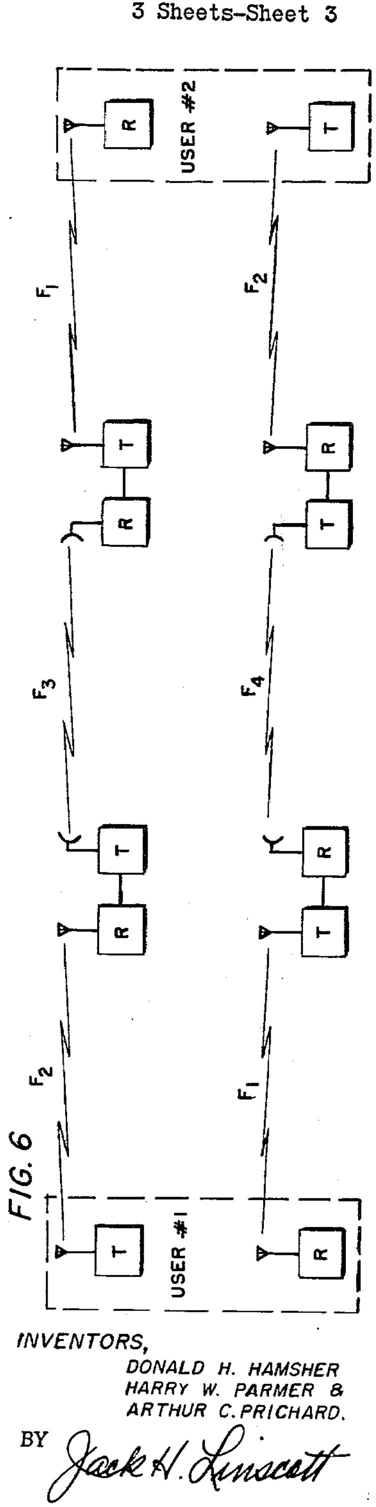
FIG. 6 is a block schematic diagram illustrating the use of the transponder principle of FIG. 5 to provide trunking between two areas.

FIG. 6 illustrates how one can apply the transponder principle to provide simple trunking between two areas, two towns for example. In this case, the output of the receiver containing all the address codes which it receives are patched, on a wide band basis, into a relay transmitter which is then received at the distant location and reradiated at the radio-frequency $F_1$ for users of the system near the distant station. Replies would return via a similar path as illustrated. It can be seen that from the users point of view, this mode of operation does not require new capability needs to be incorporated in the user equipment. All receptions still remain at the same RF frequency $F_1$ whether it comes from a transponder or a user close enough to be contacted directly, and all transmissions which cannot be contacted directly are radiated on the same RF frequency $F_2$. As long as the capacity of the system requiring extended range coverage is not exceeded, more than one remote relay transponder station can be employed either on parallel legs or these can even be connected in tandem. The reception of the signals from a particular remote transmitter provide sufficient information for a given station to radiate without ambiguity or without introducing "ring around the rosy" loading of the system.

While there has been described what is at present considered to be the preferred embodiment of this invention, it will be obvious to those skilled in the art that various changes and modifications may be made therein without departing from the invention, and it is, therefore, aimed in the appended claim to cover all such changes and modifications as fall within the true spirit and scope of the invention.

What is claimed is:

A system for selectively accepting an address code wherein a prescribed number of pulses at discrete frequencies spaced by preselected time intervals correspond to a signal message code pulse comprising, means for distributing said pulses to a plurality of parallel arranged channels each including a frequency selective filter, the first of said channels being responsive to the first pulse derived from said address code and including a proportional time delay element serially connected to said first channel filter, the remaining parallel arranged successive channels each including a proportioned time delay element and a normally closed gating circuit interconnecting a respective filter and its associated delay element, said successive channel frequency selective filters being arranged to respectively pass successive code address pulses in the order they are received, means for independently varying the time delay of said delay elements, the respective gating circuits being responsive to the coincidence of the output of the time delay varying means of the channel preceding a respective gating circuit and the output of the channel filter associated with said respective gating circuit whereby the output of a respective channel filter is passed to the respective delay element associated with said respective channel filter.

References Cited by the Examiner

UNITED STATES PATENTS

| | | | |
|---|---|---|---|
| 2,635,228 | 4/53 | Purington | 340—167 |
| 3,037,190 | 5/62 | Herbst | 179—15 X |
| 3,160,711 | 12/64 | Schroeder | 179—15 |

FOREIGN PATENTS

| | | |
|---|---|---|
| 585,340 | 10/59 | Canada. |

DAVID G. REDINBAUGH, *Primary Examiner.*